L. ANDERSON.
LOG SPLITTING MACHINE.
APPLICATION FILED JUNE 1, 1918.

1,304,528.

Patented May 27, 1919.
4 SHEETS—SHEET 1.

FIG. 1.

Inventor
L. Anderson
By Lacey & Lacey, Attorneys

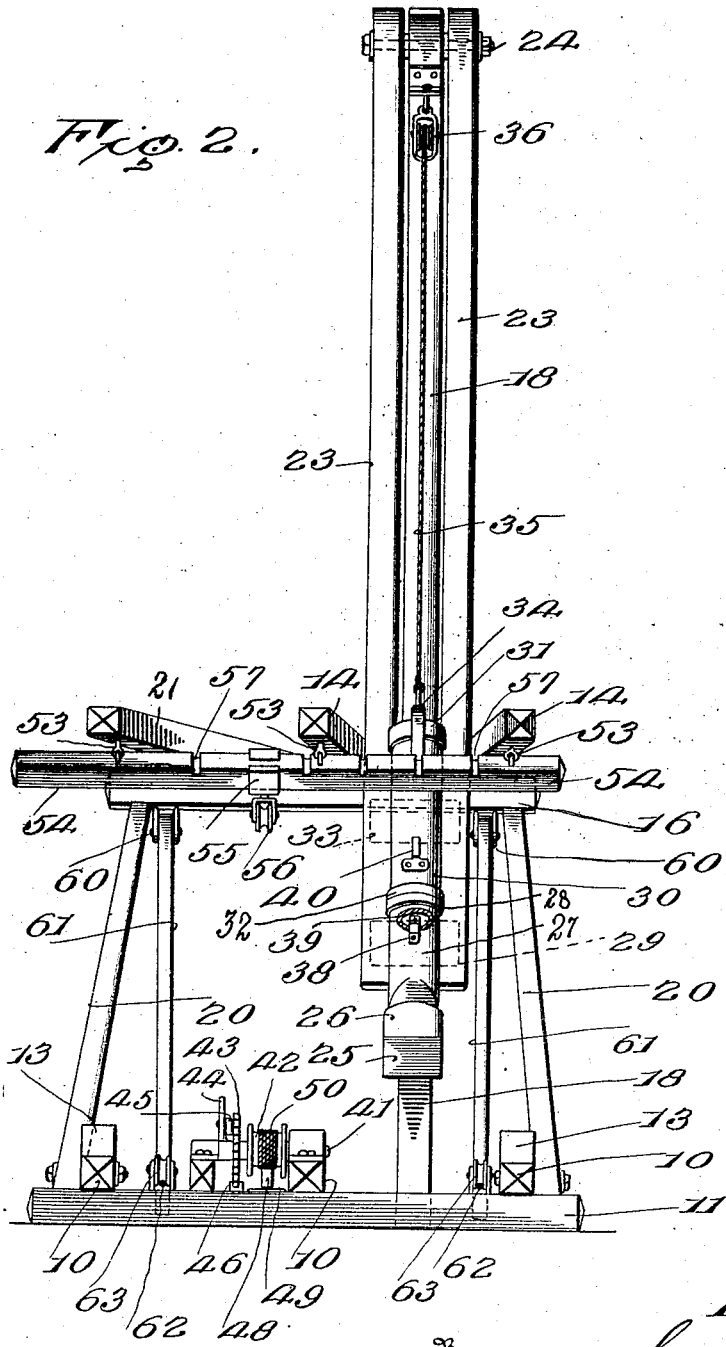

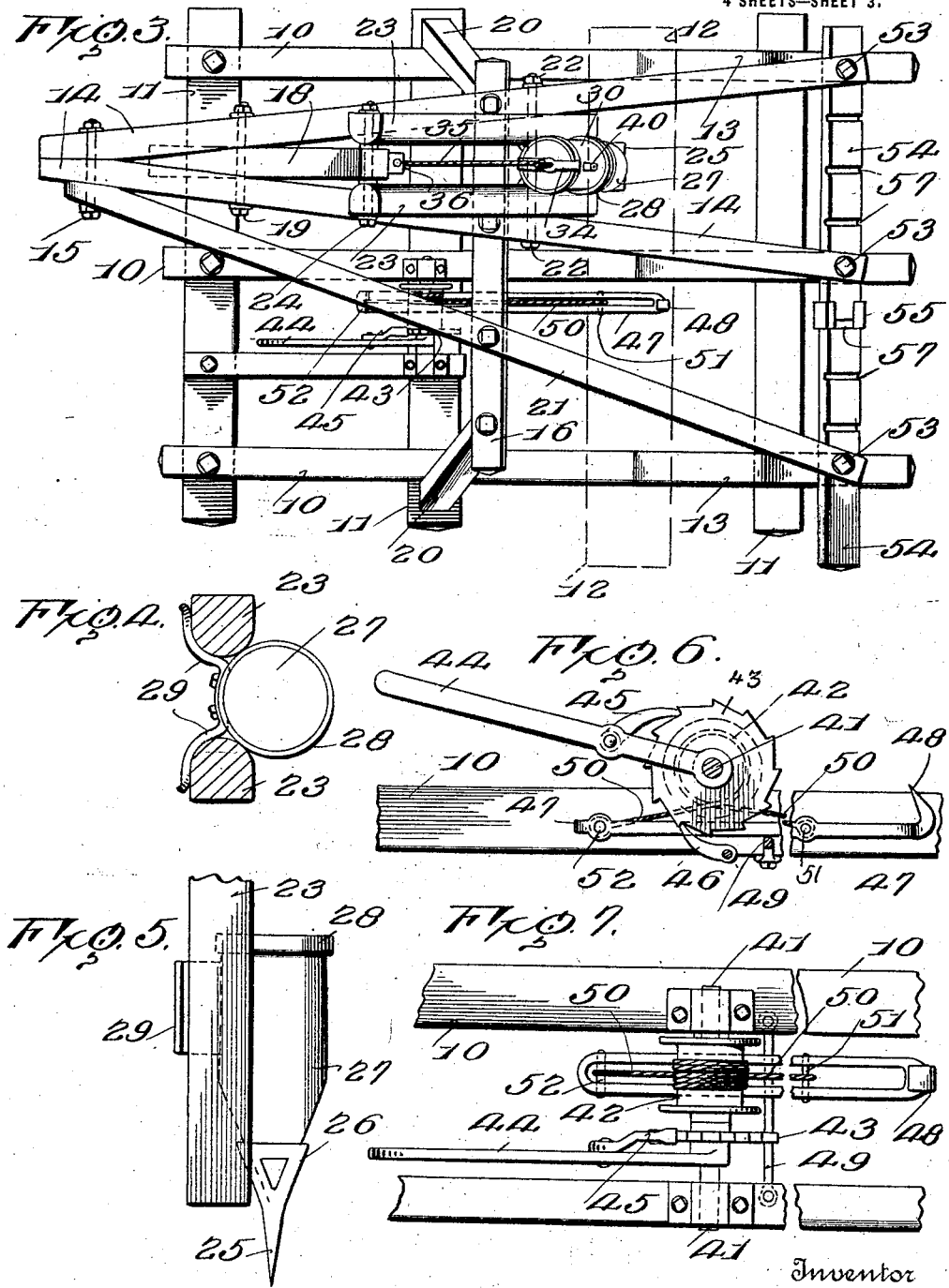

L. ANDERSON.
LOG SPLITTING MACHINE.
APPLICATION FILED JUNE 1, 1918.
1,304,528.
Patented May 27, 1919.
4 SHEETS—SHEET 4.
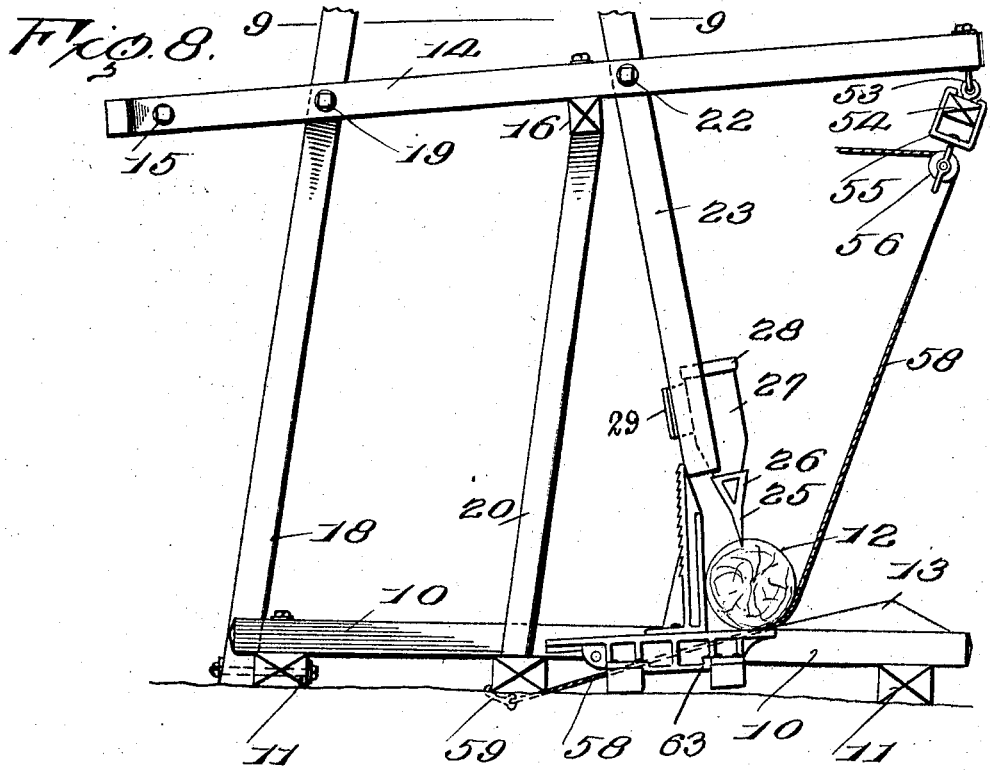
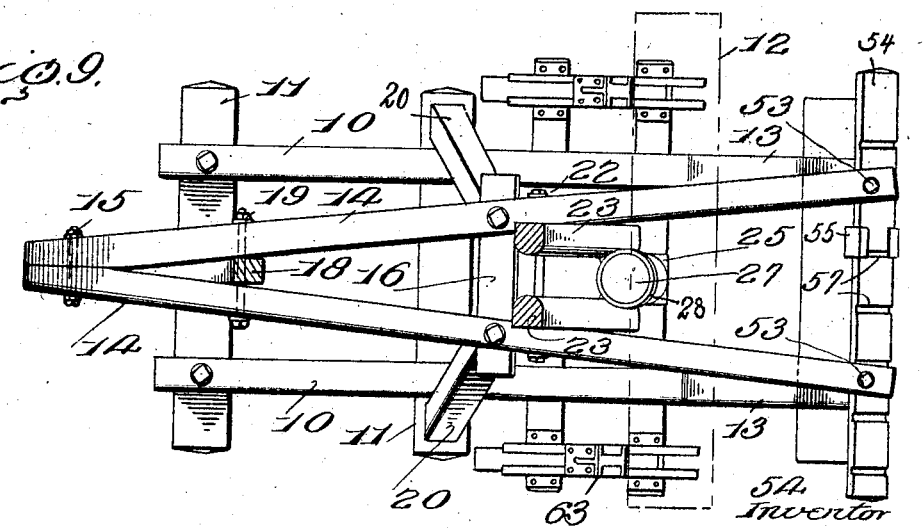
Inventor
L. Anderson
By Lacey & Lacey, Attorneys

UNITED STATES PATENT OFFICE.

LEWIS ANDERSON, OF HEMLOCK, OREGON, ASSIGNOR OF ONE-HALF TO LEE TITTLE, OF HEMLOCK, OREGON.

LOG-SPLITTING MACHINE.

1,304,528.  Specification of Letters Patent.  Patented May 27, 1919.

Application filed June 1, 1918. Serial No. 237,811.

*To all whom it may concern:*

Be it known that I, LEWIS ANDERSON, a citizen of the United States, residing at Hemlock, in the county of Tillamook and State of Oregon, have invented certain new and useful Improvements in Log-Splitting Machines, of which the following is a specification.

This invention relates to the manufacture of lumber, and has for one of its objects to provide an efficient mechanism or apparatus whereby logs may be split into any desired number of parts of any required size to facilitate the handling thereof, and likewise to facilitate transportation to the final reducing apparatus such as a saw mill, shaping machine or the like.

In many sections of the country logs are too large to be conveniently handled and operated on by ordinary saw mills, and it has been the custom heretofore to construct saw mills with a plurality of saws either of abnormal size or arranged to act upon the log from opposite sides. In some cases a third saw is employed operating at right angles to the ordinary saws. Such saw mill machines are expensive, and cumbersome, and it is impracticable to transport them from place to place. When such large mills are employed it is necessary to transport the logs to the mill, and when the logs are abnormally large, this is an expensive operation. Moreover the multiplicity and enlargement of the saws materially increases the waste caused by the extra thickness of the saws, as the larger the saw the greater the "gage" or thickness of the blade, and this extra thickness materially increases the amount of saw dust, and the corresponding increase in the waste caused thereby is a serious item.

The apparatus which is the subject matter of the present application is portable, and can be readily moved from place to place and erected convenient to the logs. By means of the improved apparatus, logs may be split into relatively small sections, which materially facilitates transportation, and decreases the expense of further reduction of the sections of split logs into lumber of commercial sizes. Another advantage of the improved apparatus is that the logs, being split, any winding or crooked grain in the lumber is revealed, and enables the manufacturer to more readily select straight grained lumber. This is an important advantage in producing lumber for special purposes, for instance in the manufacture of aeroplanes and the like. The reduction of split sections of logs into lumber of commercial sizes, may therefore be accomplished without danger of producing lumber having winding or crooked grain.

The apparatus employed to produce the desired results comprises in general a supporting or base structure formed of relatively heavy timbers upon which the log to be operated on is supported, guide members between which a splitting wedge device is mounted for movement toward the log, a hammer device movable between the guide members and adapted to exert its force against the wedge, means for supporting the log in position to be split, together with means for moving the log into position upon the supporting devices, a log turning device to enable the log to be properly positioned upon the supports for engagement by the wedge, and means for manipulating the hammer or driving member.

In the drawings illustrative of the preferred embodiment of the invention:

Figure 1 is a side elevation of the improved apparatus in its simpler form,

Fig. 2 is a front elevation,

Fig. 3 is a plan view,

Fig. 4 is an enlarged cross section on the line 4—4 of Fig. 1,

Fig. 5 is a side view of the parts shown in Fig. 4,

Fig. 6 is an enlarged side elevation of the log turning mechanism,

Fig. 7 is a plan view of the parts shown in Fig. 6,

Fig. 8 is a side elevation illustrating a modification in the manner of handling the logs, Fig. 9 is a plan view of the parts shown in Fig. 8 with the guide devices and the frame in section on the line 9—9 of Fig. 8.

The foundation or support for the logs includes stringer timbers 10 in parallel relation and spaced at suitable intervals and supported by base timbers 11, the latter resting upon the ground.

The stringer members 10 are designed to support the log to be split, indicated conventionally at 12. In the simpler form of apparatus the stringer members 10 are provided with log holding blocks 13 inclined toward each end as shown in Fig. 1.

For the purpose of this description the log supporting end of the apparatus will be referred to as the front and the opposite end as the rear of the apparatus.

Supported above the stringer members 10 is a frame including side members 14 converging toward the rear end and united by a tie bolt 15. The members 14 diverge toward the log supporting or forward ends of the stringer members 10 as shown in Fig. 3. Supported beneath the members 14 is an intermediate supporting timber 16 to which the members 14 are bolted or otherwise secured as shown. Bolted or otherwise secured to the rear base timber 11 is a brace or stay member 18 which extends between the members 14 near their converging ends and is bolted or otherwise secured to the members 14 as shown at 19. Extending between the base member 11 and the supporting member 16 are standards 20, preferably inclined inwardly toward their upper ends, and bolted or otherwise secured respectively to the base member 11 and the member 16. An additional supporting member 21 is shown extending over the member 16 and secured at one end by the bolt 15 to the members 14, the member 21 extending obliquely to the adjacent member 14, with the forward ends of the members 14 and 21 spaced substantially at uniform distances, the object to be hereafter explained. Supported by bolts or other suitable fastening devices 22 between the members 14 in advance of the member 16 are guide members 23, extending upwardly in parallel relation and bolted or otherwise secured at their upper ends at 24 upon opposite sides of the member 18.

The members 23 it will be noted by reference to Fig. 1, are supported in a rearwardly and upwardly inclined position, while the member 18 is supported in a forwardly and upwardly inclined position with the members 14 and 21 extending for a considerable distance in advance of the guide members. The guide members 23 and the log supporting blocks 13 are so disposed that the log 12 will be supported with its center in alinement with the guide devices 23 as illustrated in Fig. 1. The function of the blocks 13 is to thus support the log in position, so that the splitting device will operate effectually.

The operating element of the improved apparatus comprises a wedge 25 extended into a socket 26 to receive and support a block 27, preferably of hard wood, and reinforced by a collar or ring 28 at its upper end. The member 27 together with its wedge device and the supporting collar 28 bears against and partly between the guide members 23 as illustrated in Fig. 4. Attached to the rear face of the member 27 is a guide plate 29 extended at its ends to slidably engage the rear faces of the members 23 as shown more particularly in Fig. 4. By this means the member 27 is slidably supported relatively to the members 23. Slidably disposed partly between and against the forward faces of the members 23 is a striking or hammer device comprising a body portion 30, preferably of hard wood and having reinforcing collars 31—32 at its ends. Attached to the member 30 at its rear side is a guide plate 33 similar to and performing the same function for the member 30 as the member 29 performs for the member 27. Attached to the member 30 is a bail device 34 from which a pull cable 35 leads over a guide pulley or tackle block 36 attached to the member 18 near its upper end and between the members 23. The pull cable 35 leads downwardly and around a tackle block or guide pulley 37 attached to the rear timber 11 and is conducted thence to a suitable pulling apparatus such as the drum of a donkey engine or the like, the latter not being shown as it forms no part of the present invention. Connected at 38 to the member 27 is a holding element, preferably a section of wire cable illustrated at 39, and adapted to be engaged over a hook device 40 on the member 30, to enable the wedge device to be pulled from the log when required, as hereinafter more fully explained.

Supported upon the stringer members 10 is a shaft 41 carrying a winding drum 42 and a ratchet wheel 43. Mounted for rotation upon the shaft 41 is an operating lever 44 having a pawl 45 engaging the teeth of the ratchet. A backing pawl 46, preferably spring actuated, is connected to the framework and engages the ratchet to prevent retrograde movement of the drum. Disposed beneath the drum 42 is a frame device 47 having a log engaging hook 48 at one end. The member 47 is supported intermediate its ends by a bar 49 attached to the frame-work, and over which the member 47 is movable. A pull cable 50 is wound several times around the drum 42 and is connected at one end at 51 to the member 47 near the log engaging hook 48, and at the other end at 52 to the member 47. By this arrangement it will be obvious that when the drum 42 is rotated in one direction by manipulating the lever 44 a pulling force will be applied to the member 47 to cause the hook 48 to engage the log 12 and rotate the latter to any required extent, and then by releasing the backing pawl 46 the member 47 may be manually returned to its operative position. The device just described comprises an effectual log turning device, whereby the log 12 may be rotated upon its supports to properly position the log relative to the wedge device.

Suspended at 53 beneath the forward ends of the members 14 and 21 is a track 54 from which a hanger 55 is slidably supported, the hanger carrying a cable guide pulley 56. The track 54 is provided with transverse slots or recesses 57 in which depending portions of the hanger 55 engage to prevent the hanger from moving longitudinally of the track, while at the same time the hanger can be adjusted longitudinally of the track by simply elevating it at one end until free from the slots or recesses and moving the hanger longitudinally of the track. By this means the hanger can be adjusted upon the track to any required extent within the range of the slots 57. The hanger and its cable pulley 55 provide an efficient support for a pull cable 58. The cable 58 is adapted to be conducted over suitable guide pulleys attached to the frame-work of the apparatus and leads thence to the donkey engine or other power applying apparatus before mentioned.

The cable 58 terminates in a grip hook 59 which may be passed beneath the log 12 and engaged with the intermediate base timber 11, as shown in Figs. 1 and 8.

Mounted to swing at 60 from one of the frame members, for instance the member 16, are beams 61 each having a pull cable 62 attached to their lower ends. The cables 62 lead over suitable guide pulleys 63 to a suitable pulling mechanism, not shown.

The beams 61 are arranged to bear against the log 12 from the side opposite to the blocks 13, while the pull cables 62 coact with the beams to hold the log in place. By this arrangement an effectual means is provided for handling the logs and holding them in position upon the supports 13. The track member 54 may be of any required length, and additional supports 21 may be applied if required to provide means for supporting a track of greater length, depending upon circumstances and the position of the logs which are to be operated upon. The improved apparatus is portable, and may be set up at any convenient point where the logs have been felled and the latter drawn from any suitable distance to the apparatus.

In operation the log to be split is disposed in position upon the supports 13, with the wedge 25 in the position as shown in Fig. 1 and with the guide member 29 holding it in place relative to the guide members 23. The pull cable 35 is then actuated to elevate the striking member 30, and the cable when released will permit the striking member to fall and engage the member 27, and drive the wedge into the log. The blows may be repeated as often as may be required to complete the splitting operation. If the log is too long to be split by driving the wedge into the log at one point only, the coupling member 39 will be disposed over the hook 40 and the pull cable 35 operated to move the striking member 30 upwardly and thus pull the wedge from the log after which the log may be moved over the supports 10 and 13 a sufficient distance to enable the wedge to be driven into the log at another point, and so on as may be required to drive the wedge into the log at suitable intervals to enable the log to be split. After the log has been split the separated portions may be adjusted upon the supports 10 and 13, and again split, and the operation repeated as often as may be required to produce sections of any size.

The timber members which form the supporting structure may be of any required size or form, either of sawed timbers, or the unsawed timbers available in the woods where the apparatus is to be used. By means of the improved apparatus the heaviest logs may be split into small sections to facilitate their transportation, thus saving valuable time and reducing the labor necessary to form the logs into lumber of the required size.

The head block portion of an ordinary saw mill set works may be substituted for the members 61 as shown in Figs. 8 and 9, if available, the head block portion of a conventional saw mill set works being illustrated as a whole at 63 in Figs. 8 and 9 with the log 12 in position thereon.

Having thus described the invention, what is claimed as new is:

1. An apparatus of the class described comprising a log support, a guide member, means for rotating the log on said support, a wedge device, means for maintaining said wedge device movable relatively to said guide member, a hammer device, means for maintaining said hammer device movable relatively to said guide member and in position for its force to be applied to the wedge device, and means for actuating said hammer device.

2. An apparatus of the class described comprising log supports, means for rotating a log on a horizontal axis on said supports, guide members, a wedge, means for maintaining said wedge movable relatively to said guide members, a hammer, means for maintaining said hammer movable relative to the guide members and in position for its force to be applied to the wedge, means for actuating said hammer, and means whereby said hammer may be coupled to the wedge to enable the wedge to be withdrawn from the log.

3. An apparatus of the class described comprising log supports, means for rotating a log on a horizontal axis on said supports, guide members, a wedge, means for maintaining said wedge movable relatively to the guide members, an impact member, means for maintaining said impact member movable relatively to the guide members and in position for its force to be applied to the wedge, and means for actuating said impact member.

4. An apparatus of the class described comprising a log support, means for moving a log into position on said support, means for rotating the log on a horizontal axis on said support, guide members, a wedge movably engaging said guide members at one side, a holding member carried by the wedge and movably engaging said guide members at the opposite side, a hammer, means for maintaining said hammer movable relatively to the guide members and in position for its force to be applied to the wedge, and means for actuating said hammer.

5. An apparatus of the class described comprising a log support, means for rotating a log on a horizontal axis on said support, guide members, a wedge, means for maintaining said wedge movable relatively to said guide members, a hammer movably engaging said guide members at one side and in position for its force to be applied to the wedge, a holding member carried by the hammer and movably engaging said guide members at the opposite side, and means for actuating said hammer.

6. In an apparatus of the class described, log supporting members, a supporting frame including side members connected at one end and diverging toward their other ends, standards in spaced relation and connecting the side members intermediate their ends to the log supporting members, guide members in spaced relation and connected to said side members, a stay member connected respectively to said log supporting members side members and guide members, a wedge device, means for maintaining said wedge device movable relatively to said guide members, a hammer device, means for maintaining said hammer device movable relatively to said guide devices and in position for its force to be applied to the wedge device, and means for actuating said hammer device.

7. In an apparatus of the class described, log supporting members, a supporting frame including side members connected at one end and diverging toward the other ends, standards in spaced relation and connecting the side members intermediate the ends to the log supporting members, a wedge device movable relatively to said frame, a track suspended from said side members and having a plurality of stop slots, a traveler carrying a cable pulley and movable on said track and having stop lugs engaging in said stop slots one at a time, a pull cable operating over said cable pulley and carrying a log engaging device, and means for forcing said wedge device into a log when supported upon said supports.

8. An apparatus of the class described including a log support, means for clamping a log in position on said support, a splitting tool movable into engagement with the log, and means for rotating the log on said support.

9. An apparatus of the class described comprising a frame, a log support mounted on the frame, means for clamping a log in position on the log support, a reciprocatory splitting tool movable into engagement with the log, and means for rotating the log while in the clamping means.

10. An apparatus of the class described comprising a main frame, a log support mounted on the frame, a splitting tool movable into engagement with the log, a cable supported by the main frame and extending beneath the log, a supplemental frame mounted for swinging movement on the main frame and coacting with the cable for clamping a log on the support, and means for rotating the log on said support.

11. An apparatus of the class described comprising a main frame, a log support mounted on the frame, a track carried by the main frame, a hanger mounted on the track and provided with a sheave, a cable extending over the sheave and beneath the log and anchored to the main frame, a supplemental frame mounted for swinging movement on the main frame and coacting with the cable for clamping a log on the support, a splitting tool movable into engagement with the log, and means for rotating the log to present different faces thereof to the splitting tool.

12. An apparatus of the class described comprising a main frame, a log support on the frame, means for holding a log in position on the support, a splitting tool movable into engagement with the log, a drum mounted on the main frame, a hook arranged beneath the log support, a cable extending around the drum and operatively connected with the opposite ends of the hook, and a lever for rotating the drum to cause the hook to engage the log and turn the same to present different faces to the splitting tool.

13. An apparatus of the class described including a main frame, a log support, means for clamping a log in a horizontal plane on said support, a splitting tool movable into engagement with the log, and means for rotating the log to present successive portions of the log to the splitting tool.

14. An apparatus of the class described including a supporting frame, inclined log supports mounted on the frame, a splitting tool, means for rolling a log down the inclined portions of the supports, and means for rotating the log to present successive portions thereof to said splitting tool.

In testimony whereof I affix my signature.

LEWIS ANDERSON. [L. S.]

Copies of this patent may be obtained for five cents each, by addressing the "Commissioner of Patents, Washington, D. C."